United States Patent
Yang et al.

(10) Patent No.: US 7,519,803 B2
(45) Date of Patent: Apr. 14, 2009

(54) BUILD-TO-ORDER EMBEDDED OPERATING SYSTEM PARTITION

(75) Inventors: Fengshu Yang, Round Rock, TX (US); Shannon C. Boesch, Austin, TX (US); Christopher W. Ramirez, Cedar Park, TX (US); Roy W. Stedman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 451 days.

(21) Appl. No.: 11/349,709

(22) Filed: Feb. 8, 2006

(65) Prior Publication Data

US 2007/0186091 A1    Aug. 9, 2007

(51) Int. Cl.
G06F 9/00 (2006.01)
G06F 9/44 (2006.01)
G06F 9/445 (2006.01)
G06F 15/177 (2006.01)

(52) U.S. Cl. .............................. 713/1; 713/2; 713/100; 711/173; 717/168; 717/174

(58) Field of Classification Search ................ 713/1, 713/2, 100; 711/173; 717/168, 174
See application file for complete search history.

(56) References Cited

U.S. PATENT DOCUMENTS

| | | | | |
|---|---|---|---|---|
| 6,006,285 A * | 12/1999 | Jacobs et al. | | 710/14 |
| 6,298,427 B1 | 10/2001 | Beelitz | | 711/173 |
| 6,327,706 B1 | 12/2001 | Amberg et al. | | 717/11 |
| 6,367,074 B1 * | 4/2002 | Bates et al. | | 711/170 |
| 6,427,091 B1 | 7/2002 | Davis et al. | | 700/115 |
| 6,430,663 B1 * | 8/2002 | Ding | | 711/162 |
| 6,550,062 B2 | 4/2003 | Barajas et al. | | 717/178 |
| 6,714,937 B1 | 3/2004 | Eynon et al. | | 707/102 |
| 6,721,946 B1 | 4/2004 | Fogarty et al. | | 717/175 |
| 6,765,788 B2 | 7/2004 | Wu | | 361/680 |
| 6,839,836 B2 * | 1/2005 | Cole et al. | | 713/2 |
| 7,228,408 B2 * | 6/2007 | Wu et al. | | 713/1 |
| 7,380,148 B2 * | 5/2008 | Montero et al. | | 713/324 |
| 2002/0162444 A1 * | 11/2002 | Yu et al. | | 84/601 |
| 2004/0006690 A1 * | 1/2004 | Du et al. | | 713/2 |
| 2005/0246561 A1 * | 11/2005 | Wu et al. | | 713/300 |
| 2006/0064571 A1 * | 3/2006 | Tseng | | 713/1 |
| 2006/0259642 A1 * | 11/2006 | Du et al. | | 709/247 |
| 2007/0055860 A1 * | 3/2007 | Wang | | 713/2 |
| 2007/0079111 A1 * | 4/2007 | Chen | | 713/1 |

* cited by examiner

*Primary Examiner*—Mark Connolly
(74) *Attorney, Agent, or Firm*—Hamilton & Terrile, LLP; Stephen A. Terrile

(57) ABSTRACT

A method of enabling a user to upgrade an information handling system which includes storing an application within an embedded partition during the fabrication of the information handling system and storing a smart master boot record on the information handling system which enables access to the application stored within the embedded partition of the information handling system is disclosed.

21 Claims, 4 Drawing Sheets

US 7,519,803 B2

BUILD-TO-ORDER EMBEDDED OPERATING SYSTEM PARTITION

BACKGROUND OF THE INVENTION

1. Field of the Invention

The present invention relates to boot records used in information handling systems and more particularly to smart master and partition boot records.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One feature common to many information handling systems is an insulation layer of system resident code which resides between hardware and software of the information handling system. This code provides an operational interface between a user's applications program/operating system and the hardware of the information handling system to relieve the user of the concern about the characteristics of hardware devices. This system resident code is often referred to as a BASIC input/output system (BIOS). The BIOS allows new devices to be added to the system, while insulating the application program from the peculiarities of the hardware. BIOS frees hardware device drivers from depending on specific device hardware characteristics while providing the device driver with an intermediate interface to the device. Because BIOS is integral part of the information handling system and controls movement of data in and out of the system processor, it is resident within hardware of the information handling system such as read only memory (ROM) of the information handling system.

In build to order information handling system environments, it is known to provide flexibility in the hardware and software offerings provided to a customer. A method of providing this flexibility is by adding an embedded operating system partition to the software stack that is loaded onto the built to order information handling system.

It is known to provide built to order systems having fixed images (i.e., a software stack that is loaded onto a plurality of built to order systems) with buttons that allow customers to boot into an alternate operating system, such as Linux or an embedded Windows XP operating system. Because the hardware stack and software stack for these systems do not frequently change, it is desirable that most components needed to enable instant on functionality always be in place.

It is know to provide the BIOS of an information handling system with a master boot record (MBR) which controls the boot sequence based on pre-configured button selections. Additionally, it is known to create a dynamic partition based on the size of an embedded operating system part added to an information handling system order. The dynamic partition enables an information handling system manufacturer to offer customers with field-serviceable or customer-proof configuration options. For example, it is know to ship built to order information handling systems with an embedded Linux offering, or with an Image Restore feature such as the Dell Image Restore.

It is known to provide a media application with information handling systems. For example, the Media Direct software available on Dell information handling system provides a user easy access to saved videos, photos and music. By actuating a button on the information handling system a user is able to quickly access digital media, including content stored on external drives such as CDs/DVDs and Flash memory devices. The Media Direct software also includes an instant-on feature via which a user can access media files even when the information system is turned off. It is known to provide the Media Direct software with a basic function set as well as with an expanded function set.

SUMMARY OF THE INVENTION

In accordance with the present invention, a smart boot record is provided that enables an information handling system to access applications stored within separated partitions of built to order information handling systems. This smart boot record enables an information handling system manufacturer to enable a user to easily upgrade an information handling system, thus improving the build to order process for applications residing on an embedded operating system partition.

More specifically, the information handling system includes a smart master and partition boot record to provide different build to order embedded applications. In one embodiment, the smart master and partition boot record provides an information handling system manufacturer with a plurality of up selling opportunities for applications such as media applications. These up selling opportunities may be at the point of sale of the information handling system or after the point of sale of the information handling systems. For example, during the fabrication of the information handling system, the information handling system is configured to support the embedded application which is selected at the point of sale. Additionally, the application may be installed on the information handling system during the fabrication of the information handling system; however, the button configuration and boot path modification are deferred until after point of sale when the application is purchased by the user. Additionally, the application may be stored on an embedded partition of the information handling system; however, the application is not installed onto the information handling system after point of sale when the application is purchased by the user. Additionally, when a user purchases the application, the information handling system manufacturer provides the user a package which includes software for creating a partition, installing the application to the partition and modifying the boot path of the BIOS to boot from the partition having the application.

In one embodiment, the invention relates to a method of enabling a user to upgrade an information handling system which includes storing an application within an embedded partition during the fabrication of the information handling system and storing a smart master boot record on the information handling system which enables access to the application stored within the embedded partition of the information handling system.

In another embodiment, the invention relates to an apparatus for enabling a user to upgrade an information handling system which includes means for storing an application within an embedded partition during the fabrication of the information handling system and means for storing a smart master boot record on the information handling system where the smart master boot record enables access to the application stored within the embedded partition of the information handling system.

In another embodiment, the invention relates to an information handling system for enabling a user to upgrade an information handling system which includes a processor, memory coupled to the processor, and a smart master-boot record stored on the information handling system. The memory stores an application within an embedded partition during the fabrication of the information handling system. The smart master boot record enables access to the application stored within the embedded partition of the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
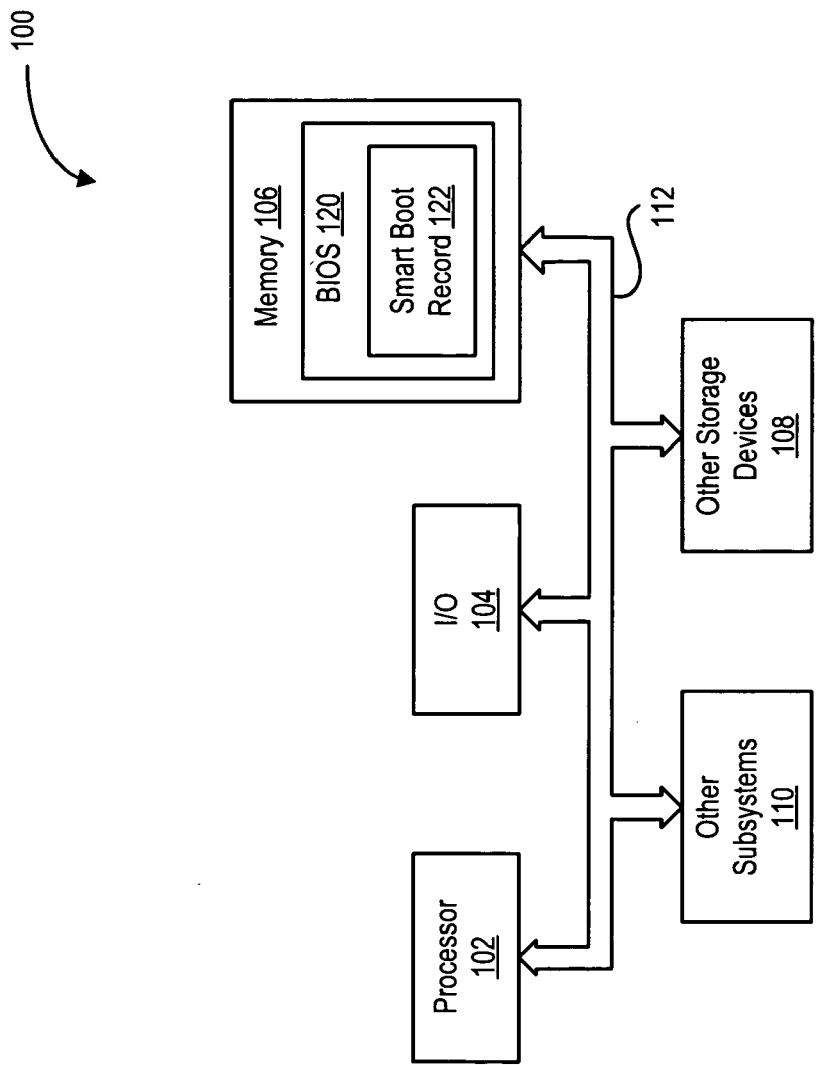
FIG. 1 shows a schematic block diagram of an information handling system having a smart boot record.

FIG. 1 shows a schematic block diagram of an information handling system having a smart boot record. The information handling system 100 includes a processor 102, input/output (I/O) devices 104, such as a display, a keyboard, a mouse, and associated controllers, memory 106 including volatile memory such as random access memory (RAM) and non-volatile memory such as read only memory and a hard disk drive, and other storage devices 108, such as a floppy disk and drive and other memory devices, and various other subsystems 110, all interconnected via one or more buses 112. The non-volatile memory 106 includes a basic input output system 120 which includes a smart master boot record 122.

The smart master boot record enables an information handling system manufacturer to provide different build to order embedded applications. More specifically the smart master and partition boot record provides the information handling system manufacturer with a plurality of up selling opportunities for applications such as media applications. These up selling opportunities may be at the point of sale of the information handling system or after the point of sale of the information handling systems. For example, during the fabrication of the information handling system, the information handling system is configured to support the embedded application which is selected at the point of sale. Additionally, the application may be installed on the information handling system during the fabrication of the information handling system; however, the button configuration and boot path modification are deferred until after point of sale when the application is purchased by the user. Additionally, the application may be stored on an embedded partition of the information handling system; however, the application is not installed onto the information handling system after point of sale when the application is purchased by the user. Additionally, when a user purchases the application, the information handling system manufacturer provides the user a package which includes software for creating a partition, installing the application to the partition and modifying the boot path of the BIOS to boot from the partition having the application.

By providing the smart boot record functionality within the BIOS, the module transparently boots from an original partition if an embedded partition is unavailable for any of a number of reasons such as the customer did not purchase the expanded function set application, the expanded function set application did not get installed correctly or even if after installation, the expanded function set application was deleted.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
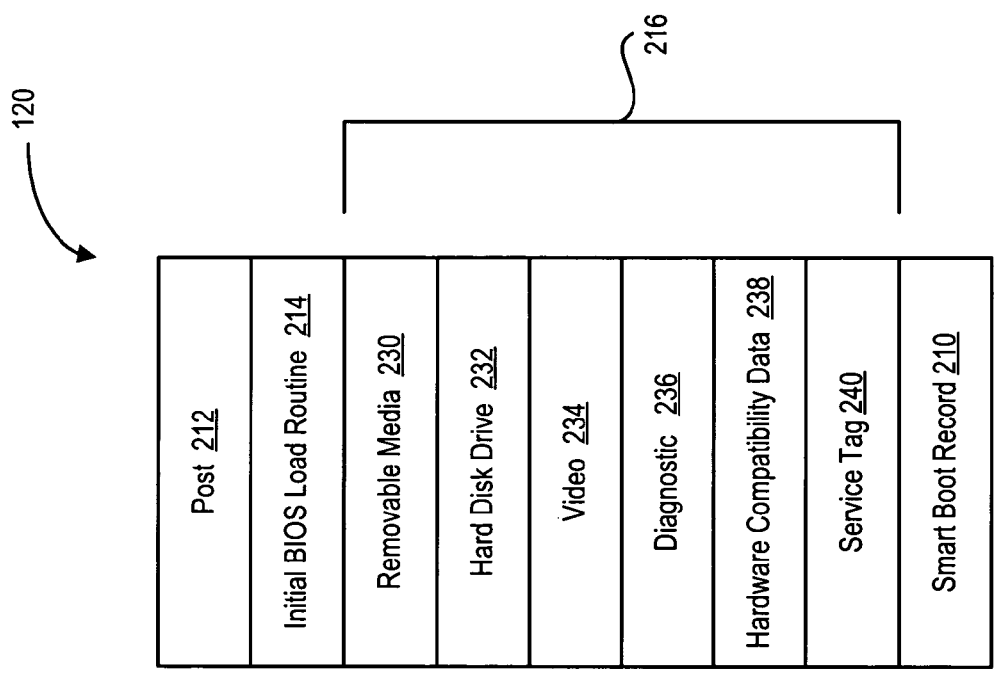
FIG. 2 shows a block diagram of a memory map of a BIOS having a smart boot record.

FIG. 2 shows a block diagram of a memory map of a BIOS 120 having a smart boot record module 210. More specifically, in addition to the smart boot record module 122, the BIOS 120 includes a power on self test (POST) module 212, an initial BIOS load module 214 as well as a plurality of hardware compatibility modules 216. The hardware compatibility modules 214 include for example, a removable media module 230, a hard disk drive module 232, a vide module 234 and a diagnostic module 236 and a hardware data module 238.

The POST module 212 performs system pre-initialization and tests. The initial BIOS load module 214 determines whether the BIOS image is to be loaded from removable media or a hard file, checks compatibility and loads the master boot record. The removable media module 230 provides input/output functions for removable media. The hard disk drive module 232 controls I/O to a fixed disk or the like. The video module 234 controls output functions to a video I/O controller which is further connected to a video display. The diagnostic module 236 provides control to a diagnostic portion of the information handling system. The hardware data module 238 stores information such as system model and sub-model information. The hardware data 238 may also include a service tag 240.

Figure 3:
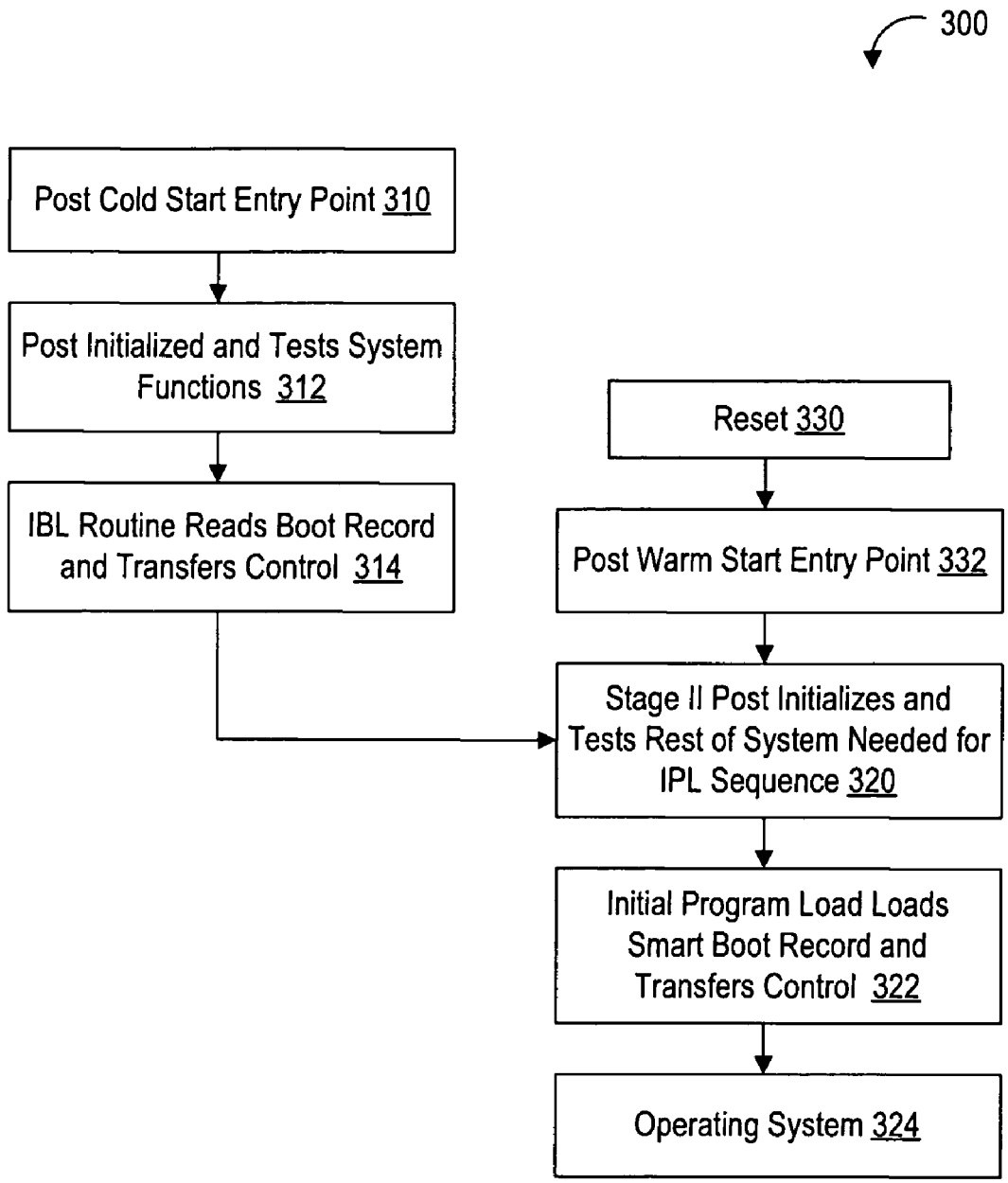
FIG. 3 shows a flow chart of an initial BIOS load.

FIG. 3 shows a flow chart of a BIOS load. More specifically, when an information handling system 100 is powered on, the processor 102 is vectored to an entry point of POST module 212 at step 310. The POST module 212 initializes the information handling system 100 and tests system functions needed to load the BIOS image at step 312. For example, the POST module 210 initializes the processor functions, diagnostic panel, memory subsystem, interrupt controllers, timers, removable media routine 230 and fixed disk BIOS routine (e.g., hard disk drive module 232).

After the POST module 212 pre-initializes the system, the POST module 212 vectors the processor 102 to the Initial BIOS load (IBL) module 214. The initial BIOS load module 214 determines where the BIOS image is stored and loads the master boot record (MBR) into RAM at step 314. The master boot record includes MBR data and the MBR code. The MBR data is used for verification purposes and the MBR code is executed to load in the BIOS image.

After the initial BIOS load module 214 loads the master boot record into RAM, the processor 102 is vectored to the starting address of the master boot record to begin execution. The MBR code performs a series of validity tests to determine the authenticity of the BIOS image and to verify the configuration of the system.

The master boot record loads the BIOS image into RAM and transfers control to the newly loaded BIOS image in main memory. Control is then transferred to POST Stage II which is included in the newly loaded BIOS image at step 320. POST Stage II initializes and tests the remaining system to load the operating system boot at step 320. After the system is initialized and tested, Stage II POST transfers control to the smart boot record module 210 at step 322 which in turn loads the appropriate operating system at step 324. During a warm start (e.g., a system reset 330), the processor is vectored to step 320, bypassing steps 310-314.

Figure 4:
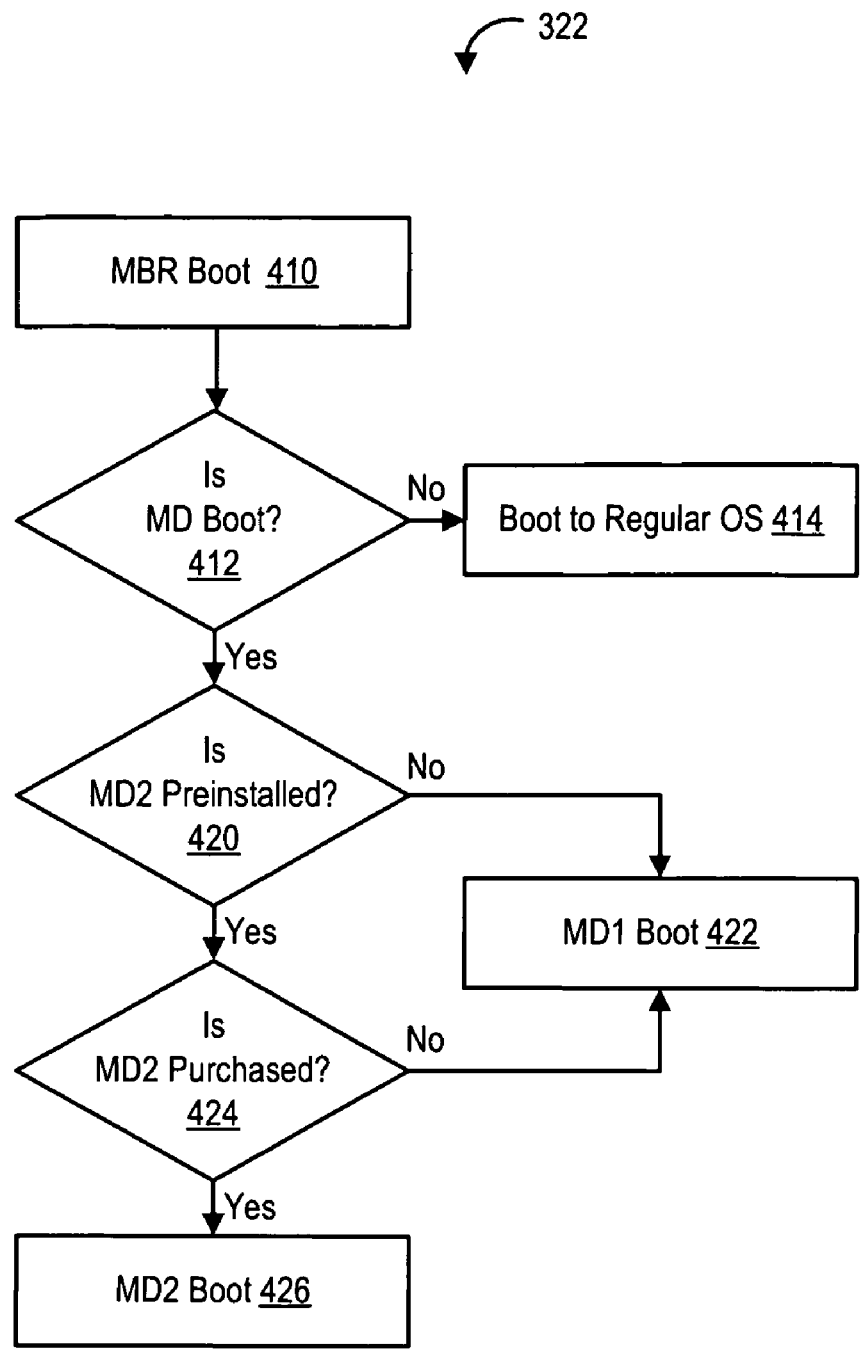
FIG. 4 shows a flow chart of the operation of a smart boot record.

FIG. 4 shows a flow chart of the operation of a smart master boot record module 210 for an example in which the embedded applications include an expanded function set media direct application such as the Media Direct 2.0 application. During the operation of the smart master boot record module, the system boot determines whether or not the boot is a media direct boot, whether or not an expanded function set media direct application such as Media Direct 2.0 is installed, whether or not media direct 2.0 has been purchased, and then boots the information handling system into the appropriate partition based on the results of the determinations.

More specifically, the smart master boot record module 210 starts the master boot record boot at step 410. The smart master boot record module next determines whether the boot process is set to be a media direct boot at step 412, by for example determining whether a flag bit has been set. If the boot process is not set to be a media direct boot, then the smart master boot record module 210 boots the information handling system to the regular operating system at step 414 such as a Windows type operating system.

If the boot process is set to be a media direct boot, then the smart master boot record module 210 then analyzes the information handling system to determine whether an enhanced media direct application has been preinstalled at step 420, by for example determining whether a flag bit has been set. If an enhanced media direct application has not been preinstalled, then the smart master boot record module 210 boots the information handling system to a basic function set media direct application at step 422. If an enhanced media direct application has been preinstalled, then the smart master boot record module determines whether the enhanced media direct application has been purchased at step 424, by for example determining whether a flag bit has been set. If the enhanced media direct application has not been purchased, then the smart master boot record module 210 boots the information handling system to a basic function set media direct application at step 422. If the enhanced media direct application has been purchased, then the smart master boot record module 210 boots the information handling system to an enhanced function set media direct application at step 426.

The flag bits may be set by the information handling system manufacturer when the application stored within the embedded partition is purchased. Certain flag bits may also be set when a user actuates a media direct button during the initialization of the information handling system. Because the smart master boot record module executes within the BIOS of the information handling system the execution of the application which is within the embedded partition is transparent to the user. Additionally, because the smart master boot record executes within the BIOS module, to which a user typically does not have access, the likelihood of a user accidentally deleting the functionality is greatly reduced.

Other Embodiments

Other embodiments are within the following claims.

For example, while specific application types have been identified, other types of applications may be provided within embedded partitions that are accessed via the smart master boot record module.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method of enabling a user to upgrade an information handling system comprising:
   storing an application within an embedded partition during the fabrication of the information handling system;
   storing a smart master boot record on the information handling system, the smart master boot record enabling access to the application stored within the embedded partition of the information handling system so as to enable the user to upgrade the information handling system to include access to the application.

2. The method of claim 1 wherein:
the application includes a media direct application.

3. The method of claim 1 wherein:
the smart master boot record is stored within a basic input output system (BIOS) of the information handling system.

4. The method of claim 1 wherein:
the smart master boot record determines whether a user indicates a desire to access the application stored within the embedded partition, the smart master boot record providing access to the application when the user so indicates and booting to a default partition when a user does not so indicate.

5. The method of claim 1 wherein:
the smart master boot record determines whether to access the application based upon setting a flag.

6. The method of claim 5 wherein:
the flag is set by a manufacturer of the information handling system when the application is purchased by a user.

7. The method of claim 5 wherein:
the flag is set in response to a user selection when booting the information handling system.

8. An apparatus for enabling a user to upgrade an information handling system comprising:
means for storing an application within an embedded partition during the fabrication of the information handling system;
means for storing a smart master boot record on the information handling system, the smart master boot record enabling access to the application stored within the embedded partition of the information handling system so as to enable the user to upgrade the information handling system to include access to the application.

9. The apparatus of claim 8 wherein:
the application includes a media direct application.

10. The apparatus of claim 8 wherein:
the smart master boot record is stored within a basic input output system (BIOS) of the information handling system.

11. The apparatus of claim 8 wherein:
the smart master boot record determines whether a user indicates a desire to access the application stored within the embedded partition, the smart master boot record providing access to the application when the user so indicates and booting to a default partition when a user does not so indicate.

12. The apparatus of claim 8 wherein:
the smart master boot record determines whether to access the application based upon setting a flag.

13. The apparatus of claim 12 wherein:
the flag is set by a manufacturer of the information handling system when the application is purchased by a user.

14. The apparatus of claim 12 wherein:
the flag is set in response to a user selection when booting the information handling system.

15. An information handling system for enabling a user to upgrade an information handling system comprising:
a processor;
memory coupled to the processor, the memory storing an application within an embedded partition, the application being stored within the embedded partition during the fabrication of the information handling system; and,
a smart master boot record stored on the information handling system, the smart master boot record enabling access to the application stored within the embedded partition of the information handling system so as to enable the user to upgrade the information handling system to include access to the application.

16. The information handling system of claim 15 wherein:
the application includes a media direct application.

17. The information handling system of claim 15 further comprising:
a basic input output system (BIOS), the smart master boot record being stored within the BIOS.

18. The information handling system of claim 15 wherein:
the smart master boot record determines whether a user indicates a desire to access the application stored within the embedded partition, the smart master boot record providing access to the application when the user so indicates and booting to a default partition when a user does not so indicate.

19. The information handling system of claim 15 wherein:
the smart master boot record determines whether to access the application based upon setting a flag.

20. The information handling system of claim 19 wherein:
the flag is set by a manufacturer of the information handling system when the application is purchased by a user.

21. The information handling system of claim 20 wherein:
the flag is set in response to a user selection when booting the information handling system.

* * * * *